Patented Jan. 30, 1951

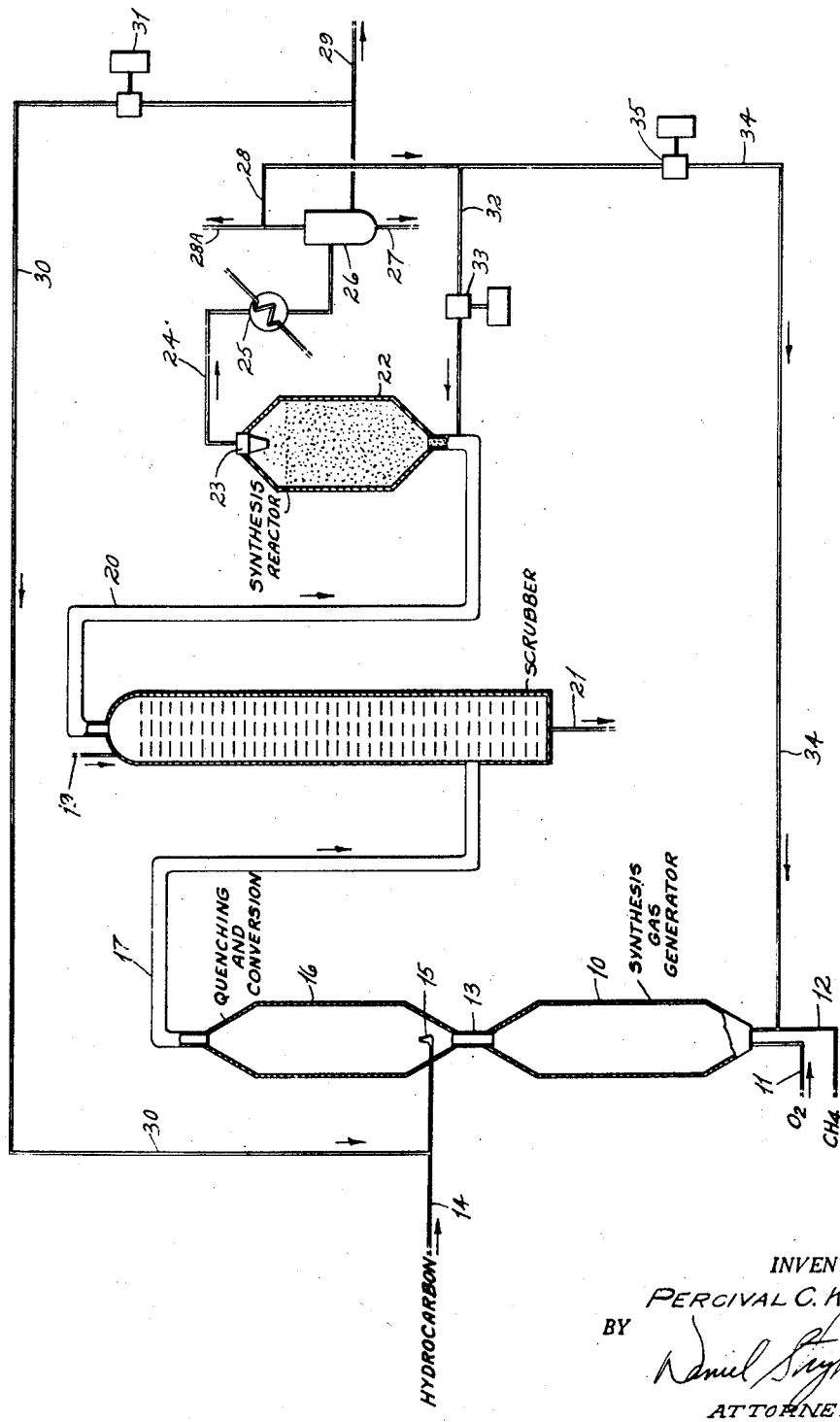

2,539,434

UNITED STATES PATENT OFFICE 2,539,434

SYNTHESIS OF HYDROCARBONS

Percival C. Keith, Peapack, N. J., assignor to Hydrocarbon Research, Inc., New York, N. Y., a corporation of New Jersey Application February 25, 1947, Serial No. 730,794

8 Claims. (Cl. 260—449.6)

The present invention relates to the synthesis of hydrocarbons and/or oxygenated hydrocarbons by the catalytic reduction of carbon oxides and more particularly is concerned with the control of such a process so as to result in the predominant production of hydrocarbon products of selected boiling ranges, for example, hydrocarbons of improved anti-knocking characteristics, boiling in the motor gasoline range.

The conventional process for the catalytic reduction of carbon oxides to hydrocarbons is normally preceded by the manufacture of so-called synthesis gas, namely, a gaseous feed containing essentially carbon monoxide and hydrogen in proper proportions. While the synthesis gas may be produced from a number of source materials, its production is conveniently illustrated by the currently important reaction between natural gas, which is essentially methane, and oxygen. Preferably, oxygen or oxygen of at least 80% purity is employed although even air may, in some cases be suitable. So also carbon dioxide and/or water vapor may be substituted in whole or in part for the oxygen.

It has been found that the generation of such synthesis gas advantageously requires relatively high temperatures such that the effluent product is liberated in excessively hot condition. While the lowest temperatures of reaction in the presence of catalyst will ordinarily be substantially over 1800° F., the most satisfactory processes of which I am aware operate at above 2000° F., sometimes as high as, for example, 3000° F. Recovery of the sensible heat from a stream of gas at such high temperatures imposes rather severe conditions upon the equipment, eliminating many of the most useful heat recovery systems, and frequently requiring cooling under circumstances attended by loss of energy and inefficiency of operation, at least during the initial stages of cooling and until a lower temperature is attained wherein the energy may be properly handled in conventional exchangers, steam boilers, heat engines and the like.

It is an object of the present invention to provide for rapidly and efficiently lowering the high temperature of the gas generator effluent to any desired level under conditions such that the heat energy may be recovered or diverted to useful purposes. The prime object of the present invention, however, contemplates the application of this energy to the introduction of desirable addition materials with the stream of synthesis gas fed to the hydrocarbon synthesis process and in one important aspect includes effecting a chemical change such as reforming, cracking, or the like, of hydrocarbon addition materials which are so combined for feed to the synthesis process. Other objects and advantages will be apparent in the consideration of the following description.

In accordance with the present invention the gas generator effluent, advantageously immediately upon generation, is quenched with a suitable proportion of an at least largely volatile, hydrocarbon product so that its temperature is reduced to any desired level depending upon the specific hydrocarbon and the relative quantity added. In such a case, the thermal energy contained in the partially cooled gaseous stream may be later recovered in heat exchangers or any other suitable economizers operating at appropriate temperature levels. So also any part of the volatile hydrocarbons in the quenched gas, as well as any entrained, non-volatile fraction, may be separated prior to passage of the synthesis gas to the reactor. On the other hand, it is usually advantageous to retain the volatile products of quenching within the stream of feed gas flowing to the synthesis reactor.

The quenching step may also be carried out with hydrocarbons which undergo endothermic reactions, e. g., cracking, at the conditions prevailing during the quenching operation. In such case, the cracking or other endothermic reaction not only utilizes efficiently the heat content of the hot synthesis gas but also may supply products such as olefins to the synthesis reactor wherein reaction with the other components of the reactant stream may take place.

Many such hydrocarbons possess a salutary effect upon the hydrocarbon synthesis reactor and are particularly advantageous in controlling the boiling range and character of the product produced. Thus, for example, cyclic hydrocarbon compounds, such as the volatile aromatics and naphthenes, tend to suppress materially the formation of low molecular weight gaseous hydrocarbons in the catalytic reduction of carbon oxides. More particularly, such substances as benzene, xylene and toluene as well as cycloparaffins, such as cyclohexane and cyclopentane, whether substituted or not, volatile at the temperature of the synthesis, definitely resist net formation of methane as well as the other $C_2$ to $C_4$ hydrocarbons so that an overall improvement results in the net production of higher hydrocarbons. By selecting appropriate temperatures, pressures and catalysts, this shift may be directed to the middle boiling range, advantageously, to the boiling range of economically desirable products such as motor gasoline.

So also the process, thus operated, tends to effect a material improvement in the degree of unsaturation and isomerization of the synthesized hydrocarbon products. In short, there is a definite tendency away from the formation of straight chain or normal aliphatic hydrocarbons in the synthesis operation. At the same time, the hydrocarbon gases in the feed, depending upon the conditions of reaction, may enter into the reaction or may pass through unchanged with the reaction products. The presence of aromatics in the product is of advantage in motor gasoline production where cyclic blending components contribute valuable antidetonating characteristics to the blend.

Beneficial effects upons the synthesis reaction also occur where the hydrocarbon introduced into the gaseous feed stream comprises olefins or highly branched paraffins. Thus, ethylene, propylene, butylene or isobutane admixed with synthesis gas may participate in the reaction and form molecules of increased size and improved degree of branching. The effect may vary somewhat depending upon the catalyst employed and the temperatures and pressures prevailing. It is more pronounced in the presence of a cobalt catalyst but it appears to be of some benefit in any event, particularly when using iron catalysts at temperatures above 550° F. and pressures above 10 atmospheres.

As noted above, the hydrocarbons, even when they do not enter into the synthesis reaction, have no adverse effect upon, but supplement the normal product of the reactor. In other words, apart from the improvements flowing from use of hydrocarbons in the feed gases, the inclusion in no way impairs the process or the final product. For purposes of full understanding, this should be contrasted with a quenching step carried out with water or any other volatile coolant which would result in contamination of the gaseous product by vapors requiring costly and difficult treatment and otherwise capable of impairing the synthesis reaction. Thus, those additional hydrocarbons resulting from the quenching step and carried into the final product may be passed through the conventional recovery system operated in the usual manner characteristic of the recovery of the products of hydrocarbon synthesis. Stated in another way, it is possible to introduce into the final product desired types of hydrocarbons either by quenching with a hydrocarbon containing the desired products or products which participate in the synthesis reaction to yield the desired products, or by utilizing the thermal energy during quenching in an endothermic reaction which results in the creation and admixture with the synthesis gas feed of predetermined proportions of hydrocarbons capable of producing the same desired effects. In its preferred embodiment, the invention contemplates chemical conversion of a quenching oil, passage of the vaporous products thereof to a synthesis reactor in combination with a synthesis gas and concurrent recovery of the desired products.

Thus, the available heat energy may be used to crack, reform or otherwise pyrogenically treat any suitable hydrocarbon to secure a controlled portion of the desired type of hydrocarbon in the feed stream. Quenching may be advantageously combined with a cracking step in order to yield aromatic hydrocarbons or unsaturates as desired.

In the case of thermal cracking, this involves, in essence, quenching to the cracking range of temperature and holding this temperature for a sufficient period of time to secure the desired conversion. While, as is known, the temperatures may vary with the stock, they are generally above about 1000° F., for instance, about 1500° F. As is further known, many types of hydrocarbons, such as the cyclic compounds, are more resistant to conversion by this method than are the aliphatic hydrocarbons. The present invention is, however, carried out with due regard for the recognized conversion ranges of the stocks in question and with the objective of furnishing to the synthesis reactor feed a predetermined content of vapor-form cyclic hydrocarbons, olefins, or branched, aliphatic hydrocarbons or any desired relative combination thereof.

For example, a suitable virgin gas oil may be sprayed into the hot gaseous product of the generator in such quantity as to lower the temperature to, for example, around 1500° F. suitable for the production of aromatic hydrocarbons. Any suitable subsequent treatment such as fractionation or scrubbing may be resorted to in order to remove heavy constituents and permit volatile hydrocarbons to pass on with the synthesis gas stream. Since the hydrocarbon synthesis process is advantageously operated under substantially elevated temperatures, the included hydrocarbon fraction may be restricted to a somewhat lower boiling range so that it will remain in gasiform conditioin throughout the reactor. The particular boiling range will depend upon the temperatures and pressures employed in the catalytic synthesis of hydrocarbons and these details accordingly form no part of the present invention except that it is advisable that no substantial portion of the hydrocarbon introduced shall tend to remain liquid at the conditions prevailing in the reactor.

The invention is not limited to cracking solely under the influence of heat, but contemplates, where desired, the use of any conventional cracking catalysts at the appropriate conditions of operation pertaining to these catalysts. One convenient method for effecting catalytic decomposition involves passage of the synthesis gas and hydrocarbons, preferably in vapor phase, through a suitable fixed bed of a cracking catalyst. Another involves the intermingling of the quenched stream of synthesis gas with a fluidized mass of powdered catalyst followed by separation of the catalyst from the stream and, if desired, the removal of normally liquid hydrocarbon products. The catalyst may be any typical conversion catalyst such as those of the silica-alumina or silica-magnesia type prepared in any conventional way together with additions of thoria or other desired improvement agents. Normally, temperatures above about 800° F. and contact times of less than a minute will be suitable, although these factors will in each case follow conventional practice, for the specific catalyst selected, the fraction under treatment, and the desired products.

As previously stated, the process of the invention may involve the introduction of a hydrocarbon into the hot synthesis gas to effect quenching or partial cooling without any material chemical change in the hydrocarbon. This may be accomplished by a rapid cooling or quenching to a temperature below the conversion range. In such case, however, the hydrocarbon generally selected is of a cyclic character, aromatic or naphthenic, since such a hydrocarbon tends to suppress the formation of gaseous hydrocarbons, to promote that of the more valuable liquid hydrocarbons in the synthesis reaction and, as indicated above, to form, per se, desirable constituents of the final product.

In order to illustrate the present invention in greater detail, reference is now made to the accompanying drawing wherein one embodiment of the present invention is illustrated. In accordance with this arrangement the numeral 10 represents a synthesis gas generator, more or less diagrammatically, to indicate a conventional form of generator supplied, for example, by a stream of oxygen from a source not shown through inlet pipe 11 and at the same time supplied with methane from another suitable source through pipe 12. Alternatively other hydrocarbon gases or even liquids may be substituted for the methane. It will be understood, of course, that the two gases are suitably mixed in the molar ratio of two parts methane to one part oxygen, and reacted in the generator, and while it is not shown, it is normally advantageous and desirable, and thus observed in the present example, to preheat the feed gases to the vicinity of the reaction temperature.

The effluent generator gas comprising, essentially hydrogen and carbon monoxide in the molar proportions of about 2:1, passes through the outlet pipe 13 to chamber 16 where it is immediately contacted by a quenching spray of a suitable petroleum fraction introduced from any source, not shown, through a feed pipe 14 and a spray nozzle 15.

The incoming hydrocarbon may consist of any suitable liquid fraction as, for example, naphtha or gas oil. Obviously from the foregoing, the heat energy of the gaseous stream is dissipated at this point by vaporization of the hydrocarbon or by an endothermic reaction thereof, or both, depending upon the hydrocarbon used for quenching and the conditions of the quench. I prefer, however, to illustrate this embodiment in connection with a virgin gas oil having a boiling range 450° to 700° F. and a cyclic hydrocarbon content of about 25%, introduced at such rate with reference to the flow of synthesis gas as to result in rapid vaporization of the entire fraction.

As indicated above the temperatures of the generator gas are normally substantially above 2000° F. Assuming, for example, a generator effluent at 2100° F., the rate of virgin gas oil addition should be adjusted to result in a temperature of about 1000° F. within the chamber 16. Approximate average residence time in the chamber 16 is about 5 seconds. Under these conditions, part of the gas oil is cracked to olefinic compounds. Chamber 16 can, moreover, be provided with a suitable catalytic filling, if desired.

The products thereof pass through outlet pipe 17 to a scrubbing column 18 supplied through pipe 19 at its top portion with a relatively heavy oil at a temperature of 550° F. Accordingly the quenched gases, which are introduced near the lower portion of the scrubbing tower as shown, pass upwardly in countercurrent relationship to the scrubbing oil. The effluent gases at a temperature of about 550° F. are passed through outlet pipe 20 and the scrubbing oil together with relatively heavy hydrocarbon fraction is removed as at 21. Part of the stream leaving at 21 may be recycled to the inlet pipe 19 after it has been cooled to a temperature of 550° F.

The quenched and scrubbed synthesis gases in the pipe 20 at a temperature of about 550° F. are directed to the lower portion of a synthesis reactor 22 where they pass upwardly through a mass of powdered iron catalyst. While the details of operation of this reactor may vary widely in accordance with the construction and technique, as known in the art, for purposes of illustration, the reactor may be of the fluidized type wherein the gases pass upwardly through a mass of finely powdered catalyst at such a rate as to suspend the particles for vibrant motion in a state of dense phase fluidization. The catalyst may, for example, be finely powdered iron of about 200–400 mesh and containing about 1% of alkali metal oxide and about 2% of alumina. Temperatures may be maintained at any desired level by means of suitable cooling tubes not shown immersed in the fluidized catalyst and supplied with a suitable coolant under fixed predetermined temperature conditions. In the embodiment referred to by way of example, the synthesis reactor operates at a temperature of 620° F. and at a pressure of 200 pounds per square inch gauge.

The reaction products liberated from the upper pseudo liquid surface of the fluidized catalyst pass through a refractory filter element 23 to an outlet pipe 24 and thence are conveyed through a condenser 25 to a separator 26. With a separator operating at a temperature of 100° F., condensed water is discharged through outlet pipe 27 and normally gaseous products including hydrocarbons, unreacted synthesis gas, carbon dioxide, and in some cases nitrogen, are withdrawn through outlet pipe 28. On the other hand, the normally liquid hydrocarbons pass through pipe 29 for further treatment or recovery. It is important to note, however, that a portion of the normally liquid hydrocarbon stream may be diverted by way of recycle line 30 and pump 31 to the inlet pipe 14 and thus may provide part or all of the quenching stream. I have found that the pyrogenic treatment of the hydrocarbon products of synthesis results in products, which in their gaseous form and in the presence of normal synthesis gas enhance the synthesis reaction materially.

The gaseous products of reaction from pipe 28 may be similarly recycled to the synthesis reactor 22 through pipe 32 and pump 33 and the excess can be vented as at 28A. The gaseous products may also be recycled to the gas generator through pipe 34 and pump 35. As will be understood by those skilled in the art, the gaseous hydrocarbons contained in this latter recycle stream as well as any by-product carbon dioxide are suitable reactants for introduction into the gas generator in the production of carbon monoxide and hydrogen. This arrangement therefore permits efficient utilization of available feed materials at high yield and efficiency.

Operating in accordance with the foregoing example wherein the quenching medium has appreciable cyclic hydrocarbons, it is found that the synthesis reaction is promoted in the direction of $C_3$ and higher hydrocarbons. Analysis of the reaction products shows that of all the carbon monoxide consumed in the synthesis reactor about 85% goes into the production of $C_3$ and higher hydrocarbons, 10% into $C_1$ and $C_2$ hydrocarbons, and 5% into by-product carbon dioxide. Such economically favorable product distribution is not otherwise readily obtainable. Furthermore, the hydrocarbons in the $C_3$ and higher fraction are predominantly hydrocarbons boiling in the gasoline range and showing good anti-knock properties.

In another example carried out the same as above, an essentially paraffinic gas oil, used as quenching stock, is converted under the reaction conditions to volatile products containing a substantial proportion of olefinic hydrocarbons, thereby favorably influencing the production of hydrocarbons in the gasoline range.

While the foregoing illustrative embodiment is described in terms of use of an iron catalyst and the maintenance of certain temperatures and pressures, it will be understood that these factors may vary widely in accordance with the synthesis reaction being employed. Thus, in place of iron, catalysts such as nickel, cobalt or ruthenium may be employed. In general, each different catalyst demands a somewhat different optimum temperature and pressure. As is known, the system using a cobalt catalyst and operated for the predominate production of hydrocarbons boiling in the gasoline range may best be controlled at a synthesis reaction pressure of around atmospheric and a temperature of about 400° F. In this event the temperatures prevailing during and subsequent to quenching are desirably varied somewhat so that the inlet temperature of the quenched and scrubbed or otherwise prepared synthesis gas is at or somewhat below the reaction temperature prevailing in the synthesis reactor and contains substantially no liquid hydrocarbon at this temperature.

The scrubber illustrated may be substituted by any suitable separation means such, for example, as one or more fractionation towers. It is, of course, possible to quench to any desired temperature and then to operate the fractionator so that the gaseous stream supplied to the reactor contains only hydrocarbons which are volatile at the reaction conditions of the reactor. Instead of the fractionating system, a condenser and separator may also be used.

Moreover, instead of returning synthesis hydrocarbons directly from the separator 26, the hydrocarbon stream so derived may be fractionated into any desired products including one appropriate for quenching.

Obviously many other modifications and variations of the invention will be apparent to those skilled in the art in light of the foregoing disclosures without any enlargement of the spirit and scope thereof and therefore only such limitations should be imposed as are indicated in the following claims.

I claim:

1. In a process which involves the generation at a temperature above about 1800° F. of a synthesis gas containing essentially hydrogen and carbon monoxide in a gas generation zone and the subsequent catalytic treatment of said synthesis gas in a synthesis reaction zone at a lower but elevated temperature in the presence of a synthesis catalyst effective to convert hydrogen and carbon monoxide into desired hydrocarbons, oxygenated hydrocarbons and mixtures thereof, the steps which comprise injecting hydrocarbons into the hot synthesis gas from said generator at a temperature above about 1800° F. thereby heating the injected hydrocarbons to a cracking temperature and effecting substantial conversion of said injected hydrocarbons into hydrocarbon products of cracking, passing said synthesis gas containing products of cracking to the synthesis reaction zone, effecting substantial conversion therein of hydrogen and carbon monoxide in the presence of said products of cracking into a desired product of improved value, and removing said product from the reaction zone.

2. The process according to claim 1 in which the injected hydrocarbons comprise normally liquid hydrocarbons.

3. The process according to claim 1 in which the injected hydrocarbons are obtained from crude petroleum.

4. In a process which involves the generation at a temperature above about 1800° F. of a synthesis gas containing essentially hydrogen and carbon monoxide in a gas generation zone and the subsequent catalytic treatment of said synthesis gas in a synthesis reaction zone at a lower but elevated temperature in the presence of a synthesis catalyst maintained under predetermined conditions of temperature and pressure effective to convert hydrogen and carbon monoxide into desired hydrocarbons, oxygenated hydrocarbons and mixtures thereof, the steps which comprises injecting hydrocarbons into the hot synthesis gas from said generator at a temperature above about 1800° F. thereby heating the injected hydrocarbons to a cracking temperature and effecting substantial conversion of said injected hydrocarbons into hydrocarbon products of cracking including those vaporizable and those non-vaporizable under said predetermined conditions of temperature and pressure, separating from the resulting mixture of gas and cracked products constituents non-vaporizable under said predetermined conditions, passing said synthesis gas and retained products of cracking to said synthesis reaction zone, effecting substantial conversion therein of hydrogen and carbon monoxide in the presence of said retained products into a desired product of improved value and removing said desired product from the reaction zone.

5. The process according to claim 4 in which the retained products of cracking include olefins, isoparaffins and cyclic hydrocarbons.

6. In a process which involves the generation at a temperature above about 1800° F. of a synthesis gas containing essentially hydrogen and carbon monoxide in a gas generation zone and the subsequent catalytic treatment of said synthesis gas in a synthesis reaction zone at a lower but elevated temperature in the presence of a synthesis catalyst effective to convert said hydrogen and carbon monoxide into desired hydrocarbons, oxygenated hydrocarbons and mixtures thereof, the steps which comprise injecting into the hot synthesis gas substantially directly upon its issue from the gas generation zone at a temperature above about 1800° F. a liquid hydrocarbon, regulating the proportion of the injected liquid hydrocarbon such that said injected hydrocarbon is heated to a cracking temperature, effecting conversion of at least a substantial portion of said hydrocarbon into cracked products in the presence of said hot gas, passing said synthesis gas containing products resulting from said cracking to the synthesis reaction zone, effecting substantial conversion of the hydrogen and carbon monoxide into desired products of reaction therein, removing the effluent reaction mixture from the synthesis reaction zone and recovering desired products of reaction therefrom.

7. In a process which involves the generation at a temperature above about 1800° F. of a synthesis gas containing essentially hydrogen and carbon monoxide in a gas generation zone and the subsequent catalytic treatment of said synthesis gas in a synthesis reaction zone at a lower but elevated temperature in the presence of a synthesis catalyst effective to convert said hydrogen and carbon monoxide into desired hydrocarbons, oxygenated hydrocarbons and mixtures thereof, the steps which comprise injecting into the hot synthesis gas substantially directly upon its issue from the gas generation zone at a temperature above about 1800° F., a liquid hydrocarbon, regulating the proportion of the injected liquid hydrocarbon such that said injected hydrocarbon is heated to a temperature effective for pyrolitically cracking a substantial portion thereof into cracked hydrocarbon products of the class consisting of olefins, isoparaffins and cyclic hydrocarbons, separating from the product those cracked hydrocarbon products which are non-volatile at the reaction conditions of the synthesis reaction zone, thereafter passing to the synthesis reaction zone, the resulting synthesis gas including a fraction of said cracked hydrocarbon products which is vaporizable at the temperature of said synthesis reaction zone, effecting substantial conversion of the hydrogen and carbon monoxide into desired products of reaction therein, removing the effluent reaction mixture from the synthesis reaction zone and recovering desired products of reaction therefrom.

8. In a process which involves the generation at a temperature above about 1800° F. of a synthesis gas containing essentially hydrogen and carbon monoxide in a gas generation zone and the subsequent catalytic treatment of said synthesis gas in a synthesis reaction zone at a lower but elevated temperature in the presence of a synthesis catalyst effective to convert hydrogen and carbon monoxide into desired hydrocarbons, oxygenated hydrocarbons and mixtures thereof, the steps which comprise injecting hydrocarbons into the hot synthesis gas from said generator at a temperature above about 1800° F. thereby forming a gaseous mixture comprising carbon monoxide, hydrogen and cyclic hydrocarbons, passing said gaseous mixture to the synthesis reaction zone, effecting substantial conversion therein of hydrogen and carbon monoxide in the presence of said cyclic hydrocarbons into a desired product of reaction, and removing from the synthesis reaction zone said desired product.

PERCIVAL C. KEITH.

REFERENCES CITED

The following references are of record in the file of this patent:

UNITED STATES PATENTS

| Number | Name | Date |
| --- | --- | --- |
| 1,609,023 | Howard | Nov. 30, 1926 |
| 2,178,824 | Atwell | Nov. 7, 1939 |
| 2,224,048 | Herbert | Dec. 3, 1940 |
| 2,356,697 | Rial | Aug. 22, 1944 |
| 2,433,072 | Stewart et al. | Dec. 23, 1947 |
| 2,438,029 | Atwell | Mar. 16, 1948 |
| 2,464,501 | Grahame | Mar. 15, 1949 |